United States Patent Office 2,808,154
Patented Oct. 1, 1957

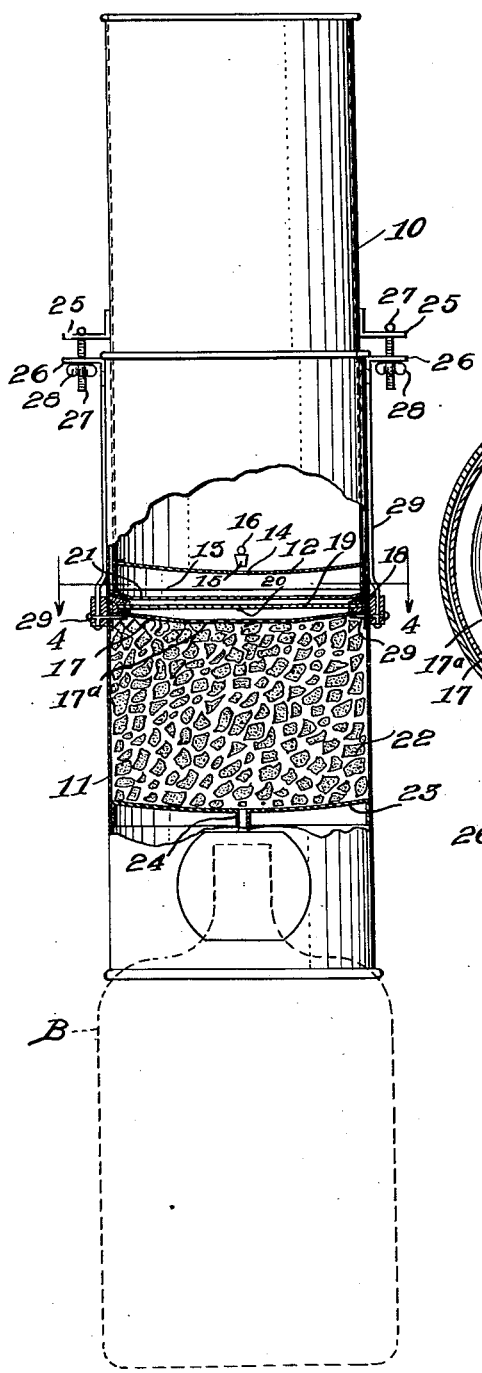
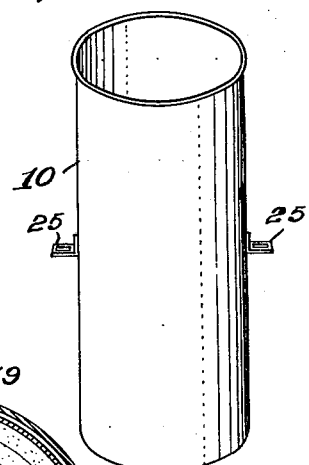
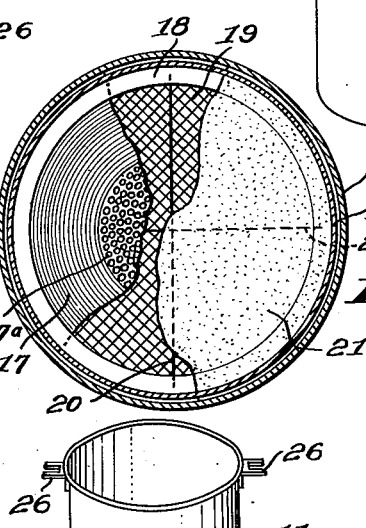
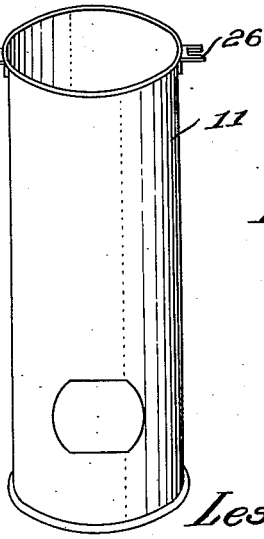

2,808,154
WATER PURIFICATION DEVICE
Leslie Lon Scott, Tulsa, Okla.
Application May 29, 1953, Serial No. 358,465
1 Claim. (Cl. 210—266)

This invention relates to a method of and apparatus for rendering water potable.

A principal object of the invention is to provide a method of rendering water potable through batch treatment thereof, for removing turbidity, pathogenic organisms, tastes and odors upon gravity flow of the water being treated.

A further object of the invention is to provide novel apparatus for batch treatment of water to render same potable by the removal of turbidity, pathogenic organisms, tastes and odors therefrom.

Other objects and advantages of the invention will become apparent in the course of the following detailed description, taken in connection with the accompanying drawing wherein:

Fig. 1 is a view partly in elevation and partly in vertical section, disclosing the principal features of the invention in accordance with a preferred embodiment thereof.

Fig. 2 is a perspective view of an upper cylindrical member embodied in the apparatus.

Fig. 3 is a perspective view of the lower cylindrical member embodied in the apparatus.

Fig. 4 is an enlarged transverse sectional view as observed in the plane of line 4—4 on Fig. 1 with the air vents omitted.

Referring now in detail to the drawings, for a more complete understanding of the apparatus by which the method is carried into effect, 10 designates an upper cylindrical member or water hopper, the apparatus also including a lower cylindrical member 11 within a substantial upper end portion of which a substantial lower end portion of the upper member is telescoped.

The upper member 10 is provided with a partition 12 adjacent to but slightly spaced above its lower end 13. The partition 12 is provided with a drain opening 14 which in an initial step of the method is closed by a stopper 15 which is provided with an eye 16.

Rigidly supported within the lower cylindrical member 11 at a relatively short distance below the lower or rim end 13 of the upper cylindrical member 10 is a gathering deck 17 which as indicated in Fig. 1 is dished downwardly and includes a central horizontal portion which is provided with a multiplicity of apertures or perforations 17a.

A rubber or plastic ring or gasket 18 is supported above the deck 17 in seating engagement with the margin thereof.

A screen assembly 19 spans the space within the gasket 18 and preferably has its margin embedded therein, and a pair of diametrically intersecting light rod supports 20 for the screen have their ends also embedded in the gasket.

A filter disk 21 is disposed above the gasket 18 and screen 19 with its margin resting upon the gasket and maintained in engagement therewith through contact of the lower end or rim 13 of the upper member 10 with the margin of the disk.

The filter disk 21 is preferably formed of paper but for specific kinds of filtering service shall be formed of cloth, felt, fibers of glass and other materials and each will vary in thickness in accordance with the character of the water and other liquids being treated.

The screen 19 will support the filter disk 21 against rupture due to the weight of the water. The screen holds the disk up so that the water will filter through it and remove the turbidity.

A volume of activated carbon 22 is disposed within the lower cylindrical member 11 between the gathering deck 17 and a lower partition 23 which is rigidly secured in position after the admission of the carbon through the lower end of member 11 which is reversed during such operation.

The partition 23 is provided with a vertical tube 24 centrally thereof and beneath which is disposed a treated water collecting bottle or like vessel B.

It may in certain installations be advisable to exert pressure on the upper and lower members 10 and 11 for positive maintenance of their operative telescoped relation and for this purpose, the upper member 10 is provided with a pair of diametrically opposed brackets 25 while the lower member 11 is provided with a pair of similarly disposed brackets 26. A pair of T-bolts 27 extends through the vertically aligned brackets 25, 26 and a thumb nut 28 is engaged with each bolt for drawing the brackets 25 and 26 forward toward each other. The tendency of separation of the members is due mainly to the introduction of air into the system and in view of which circumstances air vents 29 are provided whose inner ends open into the chamber occupied by the activated carbon 22.

Having described the apparatus in accordance with a preferred structural embodiment thereof, the method of treating water therein is as follows: First, the water to be treated is admitted into the upper cylindrical member or hopper 10 with the stopper 15 disposed within the drain opening 14, the hopper being preferably of about 5 gallon capacity. Second, chlorox or other bacteriacide is added to the water as confined within the hopper. Third, the water with added bacteriacide is stirred lightly for a few seconds. Fourth, the stopper 15 is removed from the drain opening 14 as by means of a hook on the end of the stirring stick engaged with the eye 16 on the stopper.

Fifth, the water drains through the opening 14 and falls by gravity onto the paper filter 21 where all suspended matter is removed and the water falls through the supporting screen 19 to the gathering deck 17 and from there into the activated carbon chamber where all taste and odor is removed. Sixth, the small tube 24 retards the flow of the water enough to provide proper retention time for the removal of taste and odor.

It is to be particularly observed that the gathering deck 17 is perforated only in its central portion for the reason that it is desirable to entrap the air beneath the deck and remove it through vents 29. If the gathering deck were perforated throughout its entire area, air would rise through the paper filter and defeat the process of turbidity removal.

While I have disclosed my invention in accordance with a single specific embodiment thereof, such is to be considered as illustrative only, and not restrictive, the scope of the invention being defined in the sub-joined claim.

What I claim and desire to secure by U. S. Letters Patent is:

Apparatus for treating water, comprising a pair of upper and lower cylindrical members having substantial adjacent end portions thereof in telescopic relation, a transverse partition in said upper member adjacent the lower end thereof, a stopper controlled drain opening in said partition centrally thereof, a filtering structure disposed within said lower member intermediate the ends thereof, said filtering structure comprising a plastic gasket on which the lower end of said upper member rests, a screen having its margin supported within the gasket, a disposable filter disk arranged above the screen with its margin supported on said gasket and intermediate the same and the lower end of the upper member, a downwardly dished gathering deck in said lower member beneath the filtering structure, a transverse partition in said lower member in substantial spaced relation to said gathering deck, a volume of carbon in said lower member between the gathering deck and said last mentioned partition, said lower member having a bottle neck receiving open lower end, said last mentioned partition being in substantial spaced relation to said open end and being provided with a water discharge opening centrally thereof.

References Cited in the file of this patent

UNITED STATES PATENTS

| | | |
|---|---|---|
| 218,424 | Brach | Aug. 12, 1879 |
| 316,124 | Dearden | Apr. 21, 1885 |
| 651,948 | Lawson | June 19, 1900 |
| 950,211 | Reymore et al. | Feb. 22, 1910 |
| 1,038,353 | Hagg | Sept. 10, 1912 |
| 1,169,826 | Horan | Feb. 1, 1916 |
| 1,861,481 | Rabjohn | June 7, 1932 |
| 1,889,485 | Martin | Nov. 29, 1932 |
| 1,890,969 | Chaney | Dec. 13, 1932 |
| 2,017,456 | Gudmundson | Oct. 15, 1935 |
| 2,167,225 | VanEweyk | July 25, 1939 |
| 2,335,458 | Senyal | Nov. 30, 1943 |
| 2,452,970 | Vincent et al. | Nov. 2, 1948 |

FOREIGN PATENTS

| | | |
|---|---|---|
| 626,209 | Germany | Feb. 21, 1936 |